May 9, 1967 — R. W. BRANDT, JR — 3,318,629
TREE-CLAMPING JAWS WITH DEFORMABLE PADS CONTAINING GRANULAR MATERIAL
Filed April 9, 1965
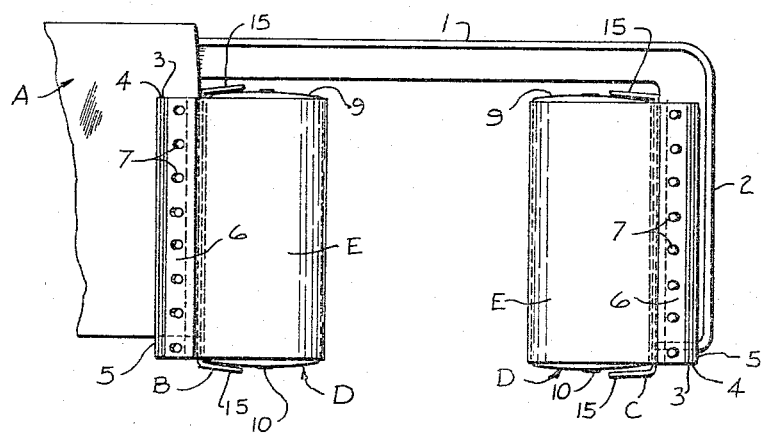
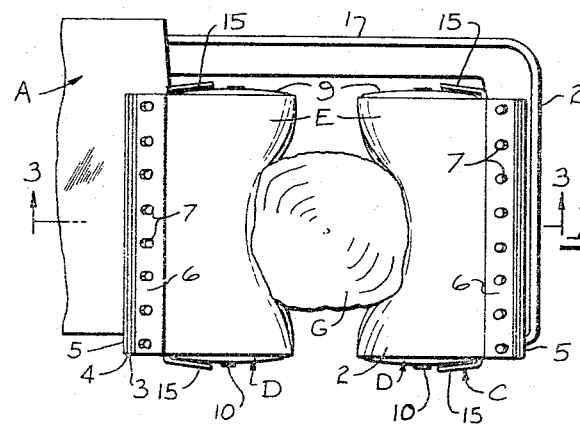
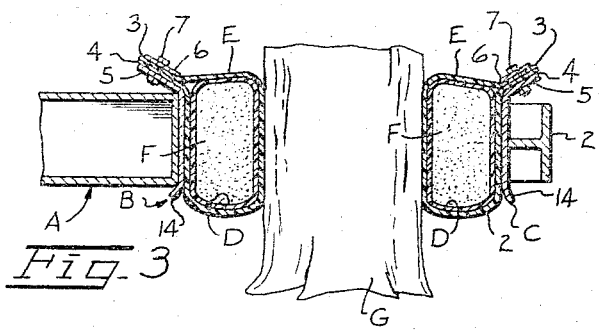
INVENTOR.
RICHARD W. BRANDT JR.
BY William R. Piper
ATTORNEY May 9, 1967  R. W. BRANDT, JR  3,318,629
TREE-CLAMPING JAWS WITH DEFORMABLE
PADS CONTAINING GRANULAR MATERIAL
Filed April 9, 1965  2 Sheets-Sheet 2

INVENTOR.
RICHARD W. BRANDT JR.
BY William R. Piper
ATTORNEY

United States Patent Office 3,318,629
Patented May 9, 1967

3,318,629
TREE-CLAMPING JAWS WITH DEFORMABLE PADS CONTAINING GRANULAR MATERIAL
Richard W. Brandt, Jr., P.O. Box 344,
Yuba City, Calif. 95991
Filed Apr. 9, 1965, Ser. No. 446,847
5 Claims. (Cl. 294—103)

The present invention relates to improvements in tree-clamping jaws with deformable pads containing granular material, and it consists in the combination, construction and arrangement of parts as hereinafter described and claimed.

In tree-shaking devices, the jaws that firmly grip the tree trunk may injure the bark or even damage the trunk itself. This is especially true of tree-shaking devices that vibrate at a high frequency and where the vibratory force is applied to the tree trunk and the direction of vibration is successively applied at different points spaced around the circumference of the tree trunk. My copending application on a Mechanical Movement, Ser. No. 78,347, filed Dec. 27, 1960, now Patent No. 3,220,268, shows one form of mechanism for shaking tree trunks and branches at a high frequency. Also in my patent on a Tree Clamp With Vibratory Mechanism and Frame, Patent No. 3,163,458, issued Dec. 29, 1964, a device is shown for gripping and vibrating tree trunks or branches at a high frequency.

The object of my invention is to provide a device for gripping a tree or other structure to be shaken without doing any damage to the tree or structure. The device uses deformable pads for the tree-clamping jaws that contain a granular material. I have found that pads of this type are readily deformable so as to be able to grip irregularly-shaped and different sized objects such as tree trunks without creating any excessive local pressures that would possibly damage the bark on a tree trunk should the jaws be used for this purpose. The loosely enclosed granular material in a deformable pad will flow and move in the pad as the pad is moved against an irregularly shaped object. The flexible surface of the pad and the loose granular material therein permits the object contacted to first make a pocket in the pad that will have a surface which will conform precisely to the irregular surface of the object contacted and then further moving of the pad against the object will cause the granular material to transmit the force directly upon and uniformly over the entire surface contacted.

Granular material such as coarse sand, metal particles or other materials such as plastic bits will shift and move when loosely confined in a deformable container, but will firmly resist movement when tightly confined. The granular material will continue to flow in the deformable pad and the flexible covering of the pad will continually change shape until the pad is pressed firmly against the surface of the object gripped. The granular material at this time will become firmly locked in position due ot the interaction of the regular or irregular shapes of the material pressing against each other. The pad will equalize the pressures applied to the tree trunk and the clamping jaws each using a pad will firmly grip the trunk and will not permit relative movement between the pads and the trunk after the pads grip the trunk and during the vibration of the jaws and trunk.

Air or other fluid can be admitted to the interior of the pads after a clamping operation if desired to fluff up or loosen the compacted granular material preparatory to using the pads for the next clamping operation. The air or other fluid in the deformable bag is used primarily to reform the bag and bring it back to its normal shape after the gripping operation is finished and prior to the next gripping operation. Any air or fluid in the bag serves as a diluent for the granular material and serves to increase the fluidity of the granular material. Air or other fluid when enclosed within the bag or pad maintains the fluidity of the granular material until the full constricting pressure is applied on the deformable bag. I have found from actual practice that the bag or pad should be filled with granular material up to about 99% of the bag's capacity and a very low static air pressure of one or two pounds should be maintained within the bag.

The pads are attached to the jaws in a novel manner that will support the pads adjacent to the jaws and yet give the pads freedom of movement so as to readily deform and act as transmitters of force from the jaws to the surface of the object gripped such as a tree trunk and for uniformly spreading this force evenly over the surfaces contacted by the pads.

The pads and their supports are simple in construction and are durable and efficient for the purpose intended.

Other objects and advantages will appear as the specification continues. The novel features of the invention will be set forth in the appended claims.

DRAWINGS

For a better understanding of my invention, reference should be made to the accompanying drawings, forming part of this application, in which:

FIGURE 1 is a plain view of a portion of a tree shaking device showing the tree gripping jaws in open position. These jaws are equipped with pads containing granular material.

FIGURE 2 is a view similar to FIGURE 1, but shows the jaws in closed position and the pads contacting with opposite sides of a tree trunk.

FIGURE 3 is a longitudinal vertical section through the portion of the housing containing the vibrating mechanism and through the tree clamping jaws. The section is taken along the line 3—3 of FIGURE 2 and the portions of the pads contacting with opposite sides of the tree trunk are shown deformed.

While I have shown only the preferred form of my invention, it should be understood that various changes, or modifications, may be made within the scope of the annexed claims without departing from the spirit thereof.

DETAILED DESCRIPTION

In carrying out my invention, I make use of a tree vibrating device and this is indicated generally at A in FIGURES 1, 2, 3 and 4. The tree vibrating device may be of any type desired but it is preferably of a construction shown in my patent on a tree clamp with vibratory mechanism and frame, Patent No. 3,163,458, issued Dec. 29, 1964. The particular vibrating mechanism is enclosed in the housing A and is not shown in this case because it forms no part of my invention.

Figure 4:
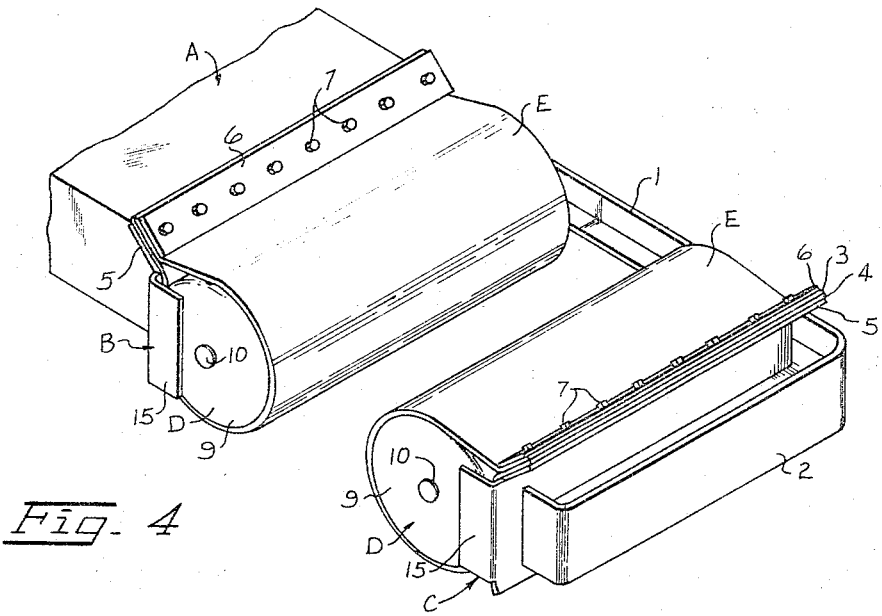
FIGURE 4 is a perspective view of two of the tree clamping jaws and illustrates how the deformable pads are connected to the jaws.

The tree vibrating device A has a stationary jaw of the type shown at B in FIGURES 3 and 4. The device also has a movable jaw C that is carried by a shank 1 that is slidably received in the housing A for the tree vibrating device. The movable jaw C is shown in open position in FIGURE 1 and in tree-gripping position in FIGURES 2 and 3. The shank 1, has a transverse portion 2, see FIGURES 1, 2, 3 and 4, and this portion in turn carries the tree-gripping jaw C. Since both the stationary jaw B and the movable jaw C support deformable tree-gripping pads D of similar construction, both pads will be referred to and one of the pads will be described in detail.

In FIGURE 4, I show the stationary jaw B as having a flexible support E for enclosing the pad D. The support E is preferably made from a strip of canvas that is looped so as to receive the pad D. Any suitable material for the support E may be used. The ends 3 and 4 of the canvas strip E are secured to the upper end 5 of the stationary jaw B. A metal strip 6 overlies the ends 3 and 4 of the flexible support E and cap screws 7 or other suitable fastening means secure the metal strip 6 and the ends 3 and 4 of the flexible support E to the end 5 of the stationary jaw B.

The pad D for the movable jaw C is supported in the same manner by a flexible support E that has its ends secured to the end 5 of the jaw by the metal strip 6 and the cap screws 7 or other suitable fastening means.

Figure 5:
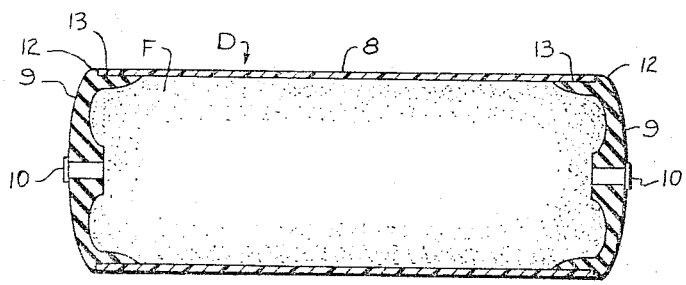
FIGURE 5 is an enlarged longitudinal section taken through the deformable pad.

I will now describe in detail the formation of the pad D. This pad is shown in longitudinal section in FIGURE 5. The pad comprises a cylindrical member 8 that is preferably twenty inches long and eight inches in diameter, although I do not wish to be confined to any exact measurement. The wall of the cylindrical member 8 is preferably made from two ply nylon roto cord and it is about one-fourth of an inch thick. Other flexible material E could be used. Each end of the deformable cylinder 8 is closed by a molded rubber end 9 and since each end is identical, like reference numerals will be applied to similar portions of each. The molded end is preferably one-half inch thick although I do not wish to be confined to any exact measurement and a metal tube 10 is inserted at the center of the end 9. The tube is hollow and coarse sand F or other granulated material may be fed through either tube 10 so as to loosely fill the interior of the pad D. The tube 10 may be closed by a valve, not shown, and mounted in the tube. The circular rim 12 of each end 9 is provided with an annular recess 13 for receiving the adjacent end of the cylindrical member 8. The ends of the cylindrical member are permanently secured to the rims 12 of the ends 9 by vulcanizing. I have shown the pad D formed of three main parts comprising the cylindrical deformable body 8, and the two deformable ends 9. It may be possible to make the pad D all in one piece.

OPERATION

From the foregoing description of the various parts of the device, the operation thereof may be readily understood. I provide a pad D for each of the two jaws B and C and I secure the pads to the jaws by the flexible supports E. It should be noted from FIGURES 3 and 4 that the flexible supports E have their ends 3 and 4 secured to the jaws B and C adjacent to the upper ends 5 of the jaws. The length of the flexible supports E is such that the pads D when in normal position will be supported substantially midway between the upper end 5 of the jaws and the lower edges 14, see FIGURE 3. The pads D practically cover the jaws B and C and are held from lateral movement with respect to the jaws by side portions 15 that are integral with the jaws.

FIGURE 1 shows the two pads D in normal position when the jaws B and C are in open position. FIGURES 2 and 3 show the pads D in deformed position as the pads are brought into gripping contact with an irregular object such as a tree trunk G. The flexible supports E will themselves become deformed when they are brought into contact with the opposite sides of the tree trunk and will permit the pads D to be deformed.

The granulated material F in the pads is initially free to flow in any direction as the pads are brought into contact with the surface of the irregularly shaped object such as the tree trunk G. This will permit portions of the flexible casings B and the pads D to be formed into pockets that will receive the adjacent portions of the tree trunk and contact uniformly with all irregular surfaces gripped by the flexible supports E and the pads D. This movement of the granulated material takes place freely within the pads D during the initial contact of the pads with the tree trunk and there will be no tendency of the flexible supports E to tear the bark of the tree as these supports are moved into gripping relation by the closing of the movable jaw C toward the stationary jaw B.

It will be noted that the deformable pads D provide novel means for gripping irregularly shaped and different sized objects firmly. If after the pads have been used for gripping an object such as a tree trunk and the granular material tends to remain in a packed condition, compressed air may be fed in through the valve-controlled tubes 10 of the pads D and will enter the interior of the pads for loosening the granulated material. Also the deformability of the pads D can be altered by the amount of granulated material received in the pad.

The pad D functions as a cushion or as a pressure equalizer and the granulated material may be rubber particles or other polymer or flexible plastic particles rather than sand. The bag G is illustrated as comprising a nylon and rubber cylinder 8 with molded rubber ends 9. In certain cases the bag may be made from other structural materials such as fabric or a metal wire or mesh. I do not wish to be confined to any particular type of material for the bag. The granular material within the bag or pad will readily deflect laterally as the pad is brought into contact with the object and permit the flexible covering for the pad to assume a contour which is complimentary to that of the surface contacted by the pad. Since the granular material such as sand, metal particles or other materials such as plastic bits will shift in the pad and move easily only when they are loosely confined within the pad, such a shifting will take place at the initial contacting of the pad with the object. As soon as the pressure is increased for packing the material within the pad in its shifted position, such firmly impacted granular material will resist movement to cause it to continue to scatter transversely within the pad. Instead the impacted material will conform to the shape of the surface of the object against which the pad is pressed and the granular material can carry a straight line thrust from the jaw directly through the granular material and to the portion of the pad contacting with the object.

Sand or other granular material within a flexible container or pad will act very much like a liquid if it is not tightly confined. The granular material will flow hydrostatically and will generally fill the pad in the same manner as a liquid. If the container for the pad is tightly filled with granular material or if it is deformed by contacting with the object to tightly confine the granular material, then this compacted material becomes firmly locked in position due to the interaction of the shapes of the granular material as they bear against each other.

Simply stated, a flexible pad having coarse sand in it may be used for gripping irregularly shaped objects such as trees that are to be shaken. The granulated material will permit the pad to assume the same shape as the surface of the object gripped and there will be no tendency for the pad to injure the bark of the tree when the clamping pressure is increased to a point where the jaws and pads firmly grip the tree.

Using another example for the gripping material in the pad, it may be likened to putty or a sponge that will first assume the complemental shape of the surface it contacts and then the material will "freeze" when the pad is deformed enough under pressure from the jaw and then will transmit the gripping force between the jaw and the object without the compacted material being moved laterally within the bag or pad to any appreciable extent.

This type of pad will transmit very large thrust forces from the clamping jaw to the object being gripped when the granulated material becomes locked or "frozen." There will be no excessive local pressure at any particular point on the tree trunk and this will obviate the risk of the pad marring the bark on the tree or damaging the tree trunk itself. This force that is transmitted by the granular material through the pad from the jaw to the object being gripped, can be very large in relation to the hydrostatic force of the granulated material against the sides of the pad. This will hold true so long as the constricting pressure is sufficient to hold the granulated material in a compact form.

The characteristics of the pad may be varied greatly by the change in the size of the particles being used in the granular material and the shape of the particles making up the granular material. The shape of the pad and the structure of the pad as well as the amount of granulated material within the pad will also determine the characteristics of the pad and its deformability.

The granulated material could be composed of semi-deformable particles. Under normal conditions the pad has about 95% to 98% of its interior filled with the granular material although I do not wish to be confined to any particular percentage. The deformability of the pad is controlled by the amount of granular material contained in the pad as well as the amount of air or other fluid present in relationship to the granular material.

I claim:
1. A clamping device for gripping a tree or other structure comprising:
   (a) a pair of jaws movable towards and away from one another;
   (b) a flexible and pliable closed container for each jaw;
   (c) means for securing said containers to said jaws;
   (d) said containers being substantially filled with a loose material of granular like configuration;
   (e) said containers conforming to the contour of an object to be gripped as said jaws move towards one another, said containers continuing to conform to the contour of said object until the constrictive pressure of the container upon the granular material causes the granules of said material to engage one another and react as a solid upon said object contemporaneous with said material having assumed the contour of said object.
2. A clamping device as set forth in claim 1 wherein said container is provided with a compressible fluid interspersed throughout the granular material.
3. A clamping device as set forth in claim 1 wehrein said container is provided with means for delivering a compressible fluid to the granular material therein.
4. A clamping device as set forth in claim 1 wherein said jaws have means thereon to restrict lateral movement of said container with respect to said jaws.
5. A clamping device for gripping a tree or other structure comprising:
   (a) a pair of jaws movable towards and away from one another, each of said jaws having a flexible and pliable closed container thereon;
   (b) the containers on said jaws being substantially filled with a loose material of granular like configuration;
   (c) said containers conforming to the contour of an object to be gripped as said jaws move towards one another, said containers continuing to conform to the contour of said object until the constrictive pressure of the container upon the granular material causes the granules of said material to engage one another and react as a solid upon said object contemporaneous with said material having assumed the contonur of said object; and
   (d) a flexible covering for each of said containers, said covering having at least one end secured to a jaw and being interposed between said object and container to permit said container to have a movement independent of said covering.

References Cited by the Examiner

UNITED STATES PATENTS

| 2,159,311 | 5/1939 | Berger | 56—328 |
| 2,268,262 | 12/1941 | Miller | 100—211 X |
| 2,357,867 | 9/1944 | Babbitt et al. | 100—211 X |
| 2,698,976 | 1/1955 | Taccone | 100—211 X |
| 3,163,458 | 12/1964 | Brandt | 214—147 X |

FOREIGN PATENTS 76,279   4/1919   Austria.

HUGO O. SCHULZ, *Primary Examiner.*